United States Patent [19]

DeMars et al.

[11] Patent Number: 5,073,391
[45] Date of Patent: Dec. 17, 1991

[54] SEMI-SOLID FOOD DEPOSITOR AND METHOD OF USE

[75] Inventors: Jimmy A. DeMars, Hugo; Thomas P. Kempf, Brooklyn Park, both of Minn.; Greg Vargas, Madison, Wis.

[73] Assignee: The Pillsbury Company, Minneapolis, Minn.

[21] Appl. No.: 688,640

[22] Filed: Apr. 19, 1991

[51] Int. Cl.⁵ .......................... A23L 1/00; A21C 9/00
[52] U.S. Cl. .................................. 426/231; 99/450.7; 118/680; 222/485; 426/289; 426/516
[58] Field of Search .............. 426/231, 289, 512, 516, 426/518; 99/450.7; 222/485; 118/680

[56] References Cited

U.S. PATENT DOCUMENTS

| | | | |
|---|---|---|---|
| 3,633,489 | 1/1972 | Spoelhof et al. | 99/450.7 |
| 3,780,643 | 12/1973 | Papai | 99/450.7 |
| 3,858,545 | 1/1975 | Fischer et al. | 99/450.7 |
| 4,264,634 | 4/1981 | Hochandel et al. | 426/289 |
| 4,395,427 | 7/1983 | Fischer et al. | 426/231 |
| 4,778,365 | 10/1988 | Archer | 425/73 |
| 4,832,961 | 5/1989 | Aoki | 426/512 |
| 4,839,185 | 6/1989 | Gram | 426/512 |
| 4,850,845 | 7/1989 | Hicks | 426/518 |

OTHER PUBLICATIONS

"On-Line Weighing System Slashes Inventories, Speeds Processing", *Modern Materials Handling*, Oct. 1988, p. 123.
"Computer Feedback on Lines Holds Bags to Targe Weights", *Package Engineering*, Sep. 1972, pp. 56–59.
"Electronic Scales Measure Up on Filling Assembly Lines", *Package Engineering*, Aug. 1982, pp. 65–66.
"Computerized Scale System Cuts Give-Away, Waste", *Package Engineering*, Jan. 1982, pp. 85–86.
"Computerized QC System Streamlines Weight Checking", *Packaging Engineering*, Jan. 1982, pp. 94–96.

*Primary Examiner*—George Yeung
*Attorney, Agent, or Firm*—Kinney & Lange

[57] ABSTRACT

A food depositing apparatus for depositing a semi-solid food product within a fixed area defined by a receptacle includes a depositing mechanism. The depositing mechanism includes an extrusion device having an opening through which semi-solid food product can be fed into the extrusion device. A pressure element coupled to a drive mechanism is configured to extrude the semi-solid food product from the extrusion device through an exit port. A valve located at the exit port is adapted to selectively control the flow of extruded semi-solid food product. An air knife positioned adjacent to the cutoff valve cuts the continuous stream of semi-solid food product into semi-solid food pieces. These pieces are deposited on the receptacle which is positioned on a scale. A control module is coupled to the scale and cutoff valve to control operation of the depositing mechanism. To deposit an amount of semi-solid food product whose total weight is within a preselected target weight range, a first amount of semi-solid food product is deposited on the receptacle and weighed to determine its precise weight. The precise weight is fed to the control module which then actuates the depositing mechanism for a second time if necessary to deposit a second amount of semi-solid food product on the receptacle. The total weight of the first and second amounts falls within ±10% of a desired target weight.

15 Claims, 6 Drawing Sheets

SEMI-SOLID FOOD DEPOSITOR AND METHOD OF USE

BACKGROUND OF THE INVENTION

This invention pertains generally to apparatus for controlling the weight of a food product deposited within a fixed area. In particular, the present invention is a mechanism for depositing a controlled amount of cheese on an upper surface of a pizza crust.

Apparatus for depositing cheese on an upper surface of a pizza crust are generally known. U. S. Pat. No. 4,264,634 to Hochandel et al. discloses one such apparatus for applying grated cheese to pizza shells. The cheese applying apparatus includes a continuous conveyor on which pizza shells are transported from one station to another. Mounted above the continuous conveyor is a grating mechanism and an intermediate transfer conveyor. The intermediate transfer conveyor comprises a continuous belt which is supported in an intermediate relationship between the grating mechanism and the continuous conveyor. The grating mechanism is selectively operable to deposit a layer of grated cheese in a predetermined pattern and layer thickness onto the intermediate transfer conveyor.

The grating mechanism apparatus is of the type which revolves a block of cheese against a fixed grating plate. As the cheese is revolved, it is also pressed forcibly against the grating plate with a predetermined force to maintain the desired uniformity in the amount of material that is removed from the cheese block. The grating plate grates the cheese block into cheese particles which fall onto an upper run of the intermediate transfer conveyor. The intermediate transfer conveyor retains the cheese particles until the transfer conveyor is actuated so as to discharge and deposit an accumulation of cheese particles onto pizza shells as they are moved past the transfer conveyor by the continuous conveyor.

The cheese applying apparatus may include a weight sensor positioned beneath the upper run of the intermediate transfer conveyor. The weight sensor is coupled to the grater mechanism. The weight sensor controls the grater mechanism so that a preset weight of cheese particles are deposited on the intermediate transfer conveyor for ultimate distribution onto the pizza shells. However, the amount by weight of cheese deposited on a pizza shell can vary up to ±30% from the preset weight due to inconsistencies in the cheese such as air pockets and density differences.

It is evident that there is a continuing need for improved mechanisms for depositing a controlled amount of cheese on the upper surface of a pizza crust. Specifically, there is a need for a depositing mechanism of efficient design which can consistently achieve a cheese deposit weight variation of no greater than ±10% from a predetermined target weight.

SUMMARY OF THE INVENTION

The present invention is a mechanism for depositing a controlled amount of a semi-solid food product within a fixed area defined by a receptacle. The depositing mechanism includes an extrusion device having first and second ends. A quantity of semi-solid food product can be fed into the extrusion device through an opening in a first end of the extrusion device. The second end of extrusion device includes an exit port. A pressure element is movable within the extrusion device via a drive mechanism so as to force the quantity of semi-solid food product fed into the extrusion device through the exit port. The semi-solid food product extruded through the exit port is deposited within the fixed area defined by the receptacle.

The receptacle is positioned atop a scale which forms part of a control mechanism. The scale is linked to a control module which is further coupled to the depositing mechanism. The control module controls the operation of the depositing mechanism, and thereby the amount of semi-solid food product extruded through the exit port of the extrusion device and deposited within the fixed area defined by the receptacle.

The depositing mechanism includes a cutoff valve positioned adjacent to the exit port. The cutoff valve is rotatable between a closed position which prevents extrusion of the semi-solid food product from the exit port, and an open position which permits extrusion of the semi-solid food product from the extrusion device. A cutting mechanism positioned distally of the cutoff valve severs the continuous output of semi-solid food product into semi-solid food pieces. In the disclosed embodiment, the semi-solid food product is cheese which is cut into cheese pieces by the cutting mechanism. The cheese pieces are deposited within a fixed area, such as the upper surface of a receptacle, such as a pizza crust. However, the depositing mechanism can also be used with other types of semi-solid food product, such as sauce, pepperoni, hamburger and sausage.

In operation, the cheese pieces are deposited onto the upper surface of the pizza crust in a depositing cycle defined by a usually two step process. A first amount of cheese pieces are deposited on the pizza crust by the depositing mechanism. The weight of the first amount of cheese pieces is such that it is equal to or less than a predetermined target weight that falls within a preselected target weight range. The interval of the first deposit (i.e., the interval of time between the start of the first deposit and the closing of the cutoff valve) is based upon the rate of deposit of the cheese. This rate of deposit is based upon previous deposits whose rate of deposit is calculated by the control module. In other words, it is assumed that the consistency (which determines the rate of deposit) of one cheese deposit is very much like that of a prior cheese deposit. Hence, the rate of the one cheese deposit is based upon the rate of the previous cheese deposit which is calculated by the control module (based upon the weight of the previous cheese deposit as determined by the scale) once the previous cheese deposit is fully deposited on the pizza crust. To put it simply, the rate of deposit of a current deposit is used to predict the interval of time required for the next deposit.

Once the first amount is deposited, the pizza crust with the first amount of cheese pieces thereon is weighed by the scale. The scale determines the precise weight of the first amount of cheese pieces. This precise weight is then fed to the control module which determines the difference between the precise weight of the first amount and the predetermined target weight.

Once this difference is determined, the control module uses this information to once again actuate the depositing mechanism to deposit a second amount of cheese pieces on the pizza crust. The weight of the second amount is determined by the control module such that the total weight of cheese pieces (i.e, the total weight of the first and second deposits) on the pizza crust is within the preselected target weight range. The control module determines the interval of the second deposit (i.e., the interval of time between the start of the second deposit and the closing of the cutoff valve) and thereby the weight of the second deposit, based upon the difference between the precise weight of the first amount and the predetermined target weight and the rate of accumulation of the first deposit. The rate of accumulation of the first deposit is determined by the control module based upon the precise weight of the first deposit as calculated by the scale. However, if the precise weight of the first amount of cheese pieces falls within the preselected target weight range, their is no need for the control module to actuate the depositing mechanism to deposit the second amount of cheese pieces. The above-described depositing cycle occurs in less than five seconds and preferably in less than one second.

In an alternative embodiment, the weight of the first amount of cheese pieces is monitored by the scale while the first amount is being deposited on the pizza crust. This accumulation of weight information is continually fed to the control module. While the first amount of cheese pieces is being deposited, the control module uses the accumulation of weight information to determine the rate at which cheese is being deposited on the pizza crust. Based upon this rate of deposit calculation, the control module determines the desired cutoff valve closure time. With the first amount of cheese pieces deposited on the pizza crust, the scale then determines the precise weight of the first amount. This precise weight is then fed to the control module which determines the difference between the precise weight of the first amount and the predetermined target weight.

Once this difference is determined, the control module uses this information to once again actuate the depositing mechanism to deposit a second amount of cheese pieces on the pizza crust. The weight of the second amount is determined by the control module such that the total weight of cheese pieces (i.e., the total weight of the first and second deposits) on the pizza crust is within the preselected target weight range. The control module determines the interval of the second deposit (i.e., the interval of time between the start of the second deposit and the closing of the cutoff valve) based upon the difference between the precise weight of the first amount and the predetermined target weight and the rate of accumulation of the first deposit. However, if the precise weight of the first amount of cheese pieces falls within the preselected target weight range, their is no need for the control module to actuate the depositing mechanism to deposit the second amount of cheese pieces. In the alternative embodiment, the depositing cycle occurs in less than five seconds and preferably in less than one second.

This depositing mechanism and method of use is relatively uncomplicated and consistently achieves a deposit weight variation no greater than ±10% from a predetermined target weight.

DETAILED DESCRIPTION OF THE PREFERRED EMBODIMENTS

Figure 1:
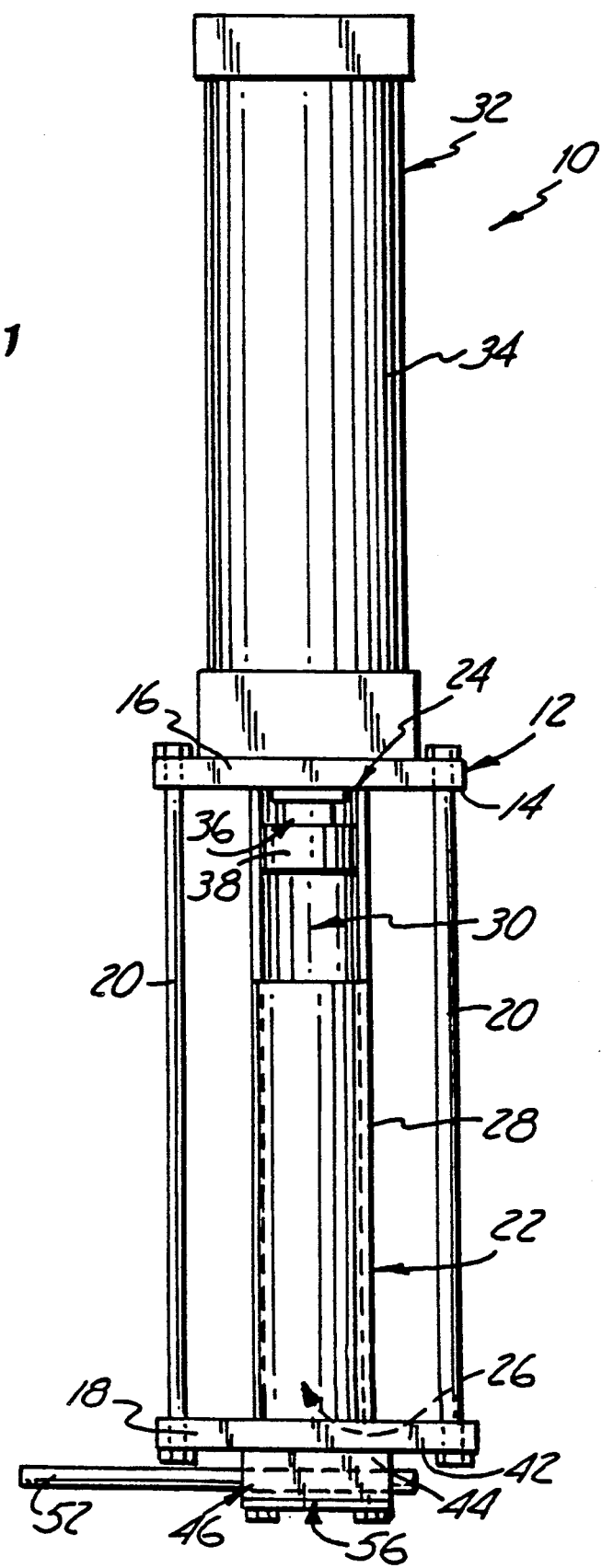
FIG. 1 is a front elevational view of a depositing mechanism which forms part of a semi-solid food depositor in accordance with the present invention.
Figure 2:
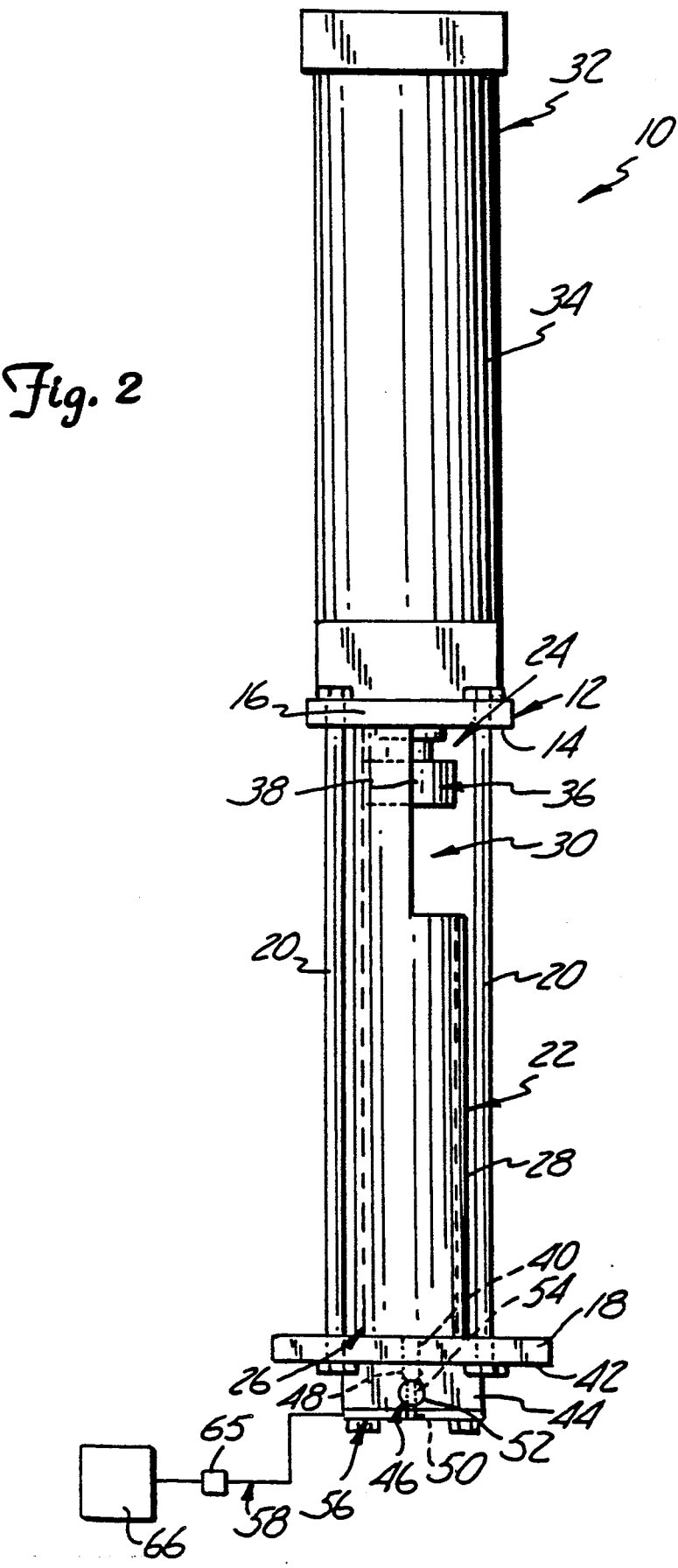
FIG. 2 is a side elevational view of the depositing mechanism shown in FIG. 1.

A semi-solid food depositor 10 in accordance with the present invention is illustrated generally in FIGS. 1 and 2. The food depositor 10 includes a depositing mechanism 12 having a frame 14 defined by an upper extrusion plate 16 and a lower extrusion plate 18. The upper extrusion plate 16 is coupled to the lower extrusion plate 18 by four support members such as bolts 20. Extending between the upper and lower extrusion plates 16 and 18 is an extrusion device such as an extrusion cylinder 22. The extrusion cylinder 22 includes an open first end 24 and an open second end 26. A sidewall 28 of the extrusion cylinder 22 includes an infeed opening 30 adjacent to the open first end 24. The infeed opening 30 allows a semi-solid food product, such as cheese to be fed into the extrusion cylinder 22 either manually or automatically.

Mounted above the upper extrusion plate 16 is a ram mechanism 32. The ram mechanism 32 includes a main cylinder 34 and a pressure element, such as piston member 36, which is movable relative to the main cylinder 34. The piston member 36 is movable relative to the main cylinder 34 by way of pneumatic pressure. However, the piston member 36 may be movable via other actuation means, such as hydraulic or mechanical actuators. The piston member 36 includes a head element 38 that is closely received within the extrusion cylinder 22 through the open first end 24. The head element 38 acts to press the cheese fed into the extrusion cylinder 22 upon actuation of the piston member 36. As seen best in FIGS. 3 and 4, the lower extrusion plate 18 includes an exit port such as a plurality of extrusion channels 40. In the embodiment of FIGS. 1-4, five extrusion channels 40 are shown (For clarity, the extrusion channels 40 are not shown in FIG. 1). When pressure is applied to the cheese via the piston member 36, the cheese is extruded through the extrusion channels 40 in a continuous manner.

Figure 3:
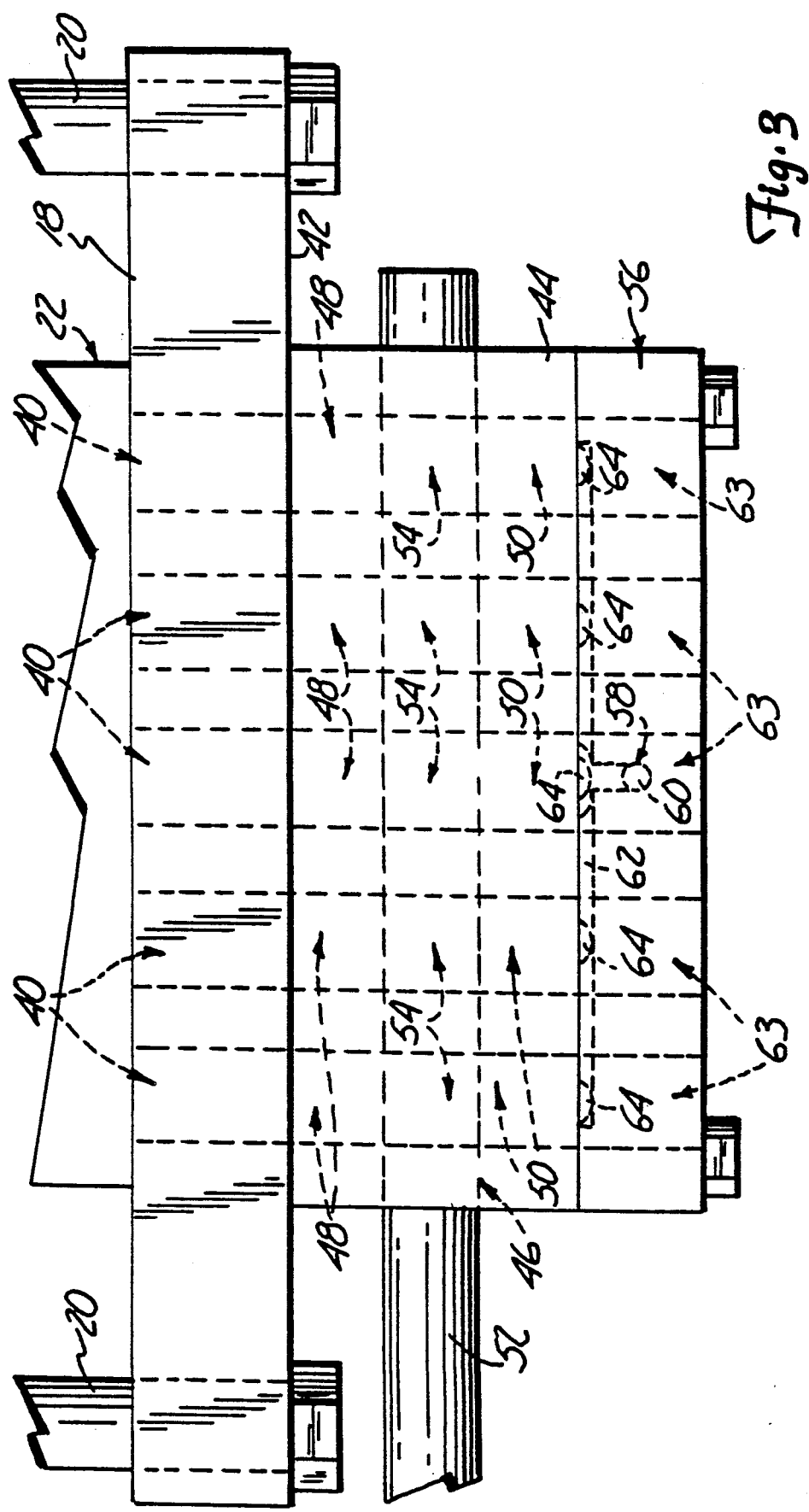
FIG. 3 is an enlarged front elevational view showing the particulars of the lower extrusion plate, die block, cutoff valve and air knife cutoff plate that form part of the depositing mechanism shown in FIG. 1.
Figure 4:
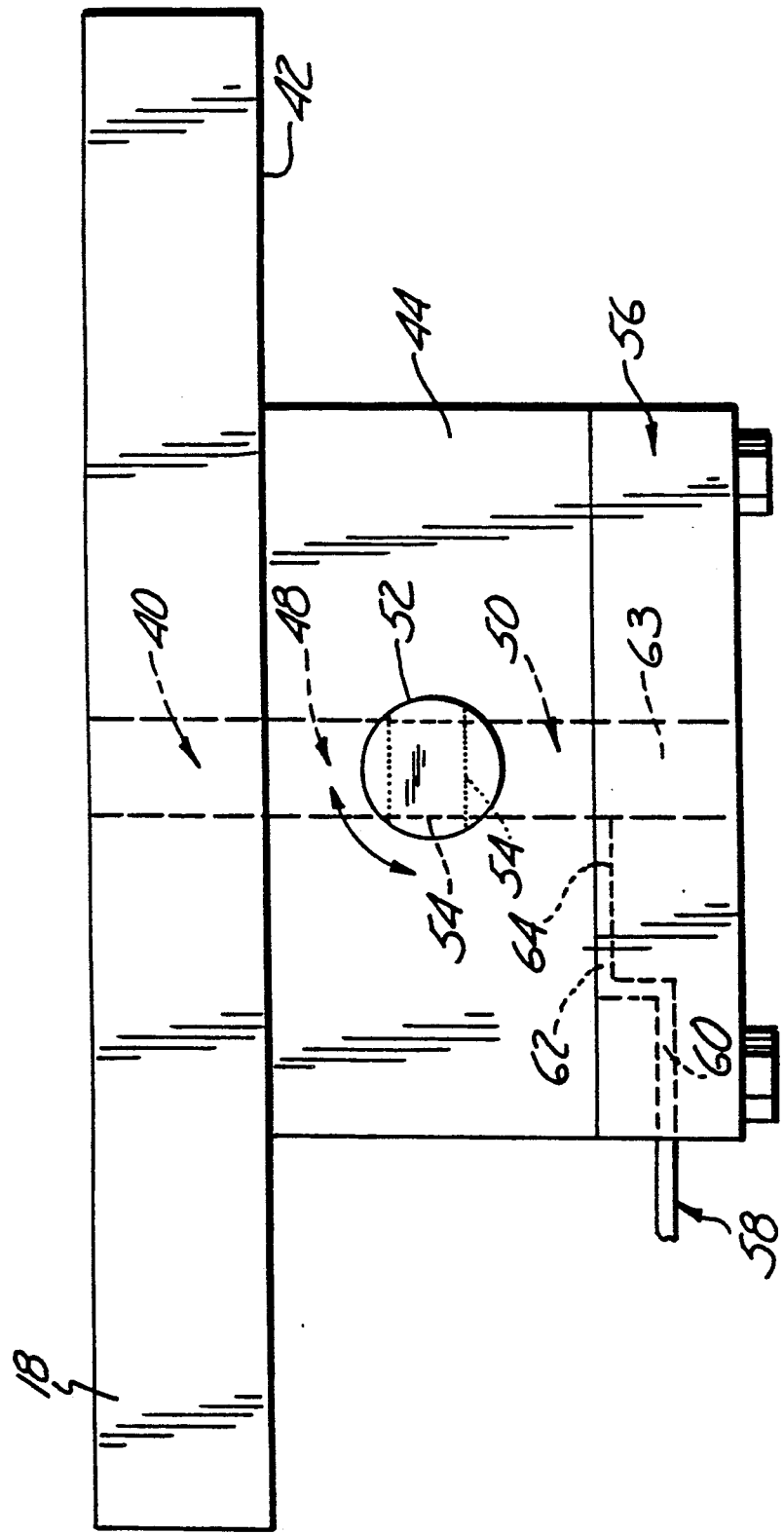
FIG. 4 is an enlarged side elevational view of the components shown in FIG. 3.

As seen best in FIGS. 3 and 4, mounted to a bottom surface 42 of the lower extrusion plate 18 is a die block 44. The die block 44 includes a laterally extending cylindrical channel 46 that extends through the die block 44. Positioned above and below the cylindrical channel are upper and lower die openings 48 and 50, respectively, which are in aligned registry with the extrusion channels 40 of the lower extrusion plate 18. The cylindrical channel 4 is configured to receive a rotatable cutoff valve 52 which includes a plurality of through openings 54.

The cutoff valve 52 can be rotated between an open position (shown in solid lines in FIG. 4) wherein the through openings 54 in the cutoff valve 52 are aligned with the extrusion channels 40 and the upper and lower die openings 48 and 50 to allow the cheese to be extruded through the die block 44, and a closed position (shown in dashed lines in FIG. 4) wherein the cutoff valve 52 is rotated so that the through openings 54 are not aligned with the extrusion channels 40 and the die openings 48 and 50 so as to prevent the cheese from being forcibly extruded from the extrusion cylinder 22.

Figure 5:
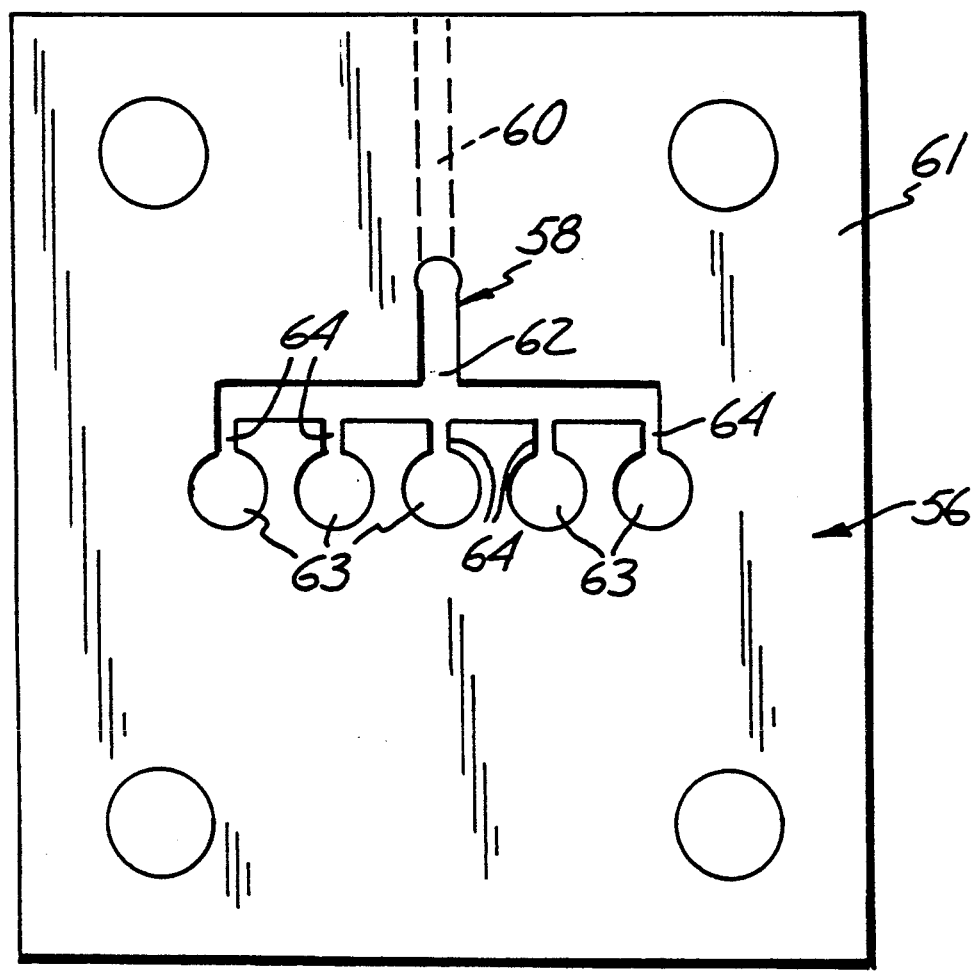
FIG. 5 is a top plan view of an air knife cutoff plate which forms part of the depositing mechanism shown in FIG. 1.

Mounted beneath the die block 44 is a cutting mechanism such as an air knife cutoff plate 56 that severs the continuous flow of cheese from the extrusion cylinder 22 into cheese pieces. As seen in FIG. 4 and 5, the air knife cutoff plate 56 includes an air conduit 58 defined by a main section 60 and a feed section 62 having a plurality of air nozzles 64. The air nozzles exit into through openings 63 which are aligned with the die openings 48 and 50 of the die block 44. The feed section 62 and the air nozzles 64 are routed into a top surface 61 of the cutoff plate 56. The air conduit 58 includes a valve mechanism 65 and an air compressor 66 is secured to the air conduit 58 proximal to the valve mechanism 65. The compressor 66 feeds a continuous flow of air into the air conduit 58 to the valve mechanism 65. The valve mechanism 65 moves rapidly between open and closed states to produce pulses to air that travel from the valve mechanism 65 out through the air nozzles 64. The air pulses act to sever the continuous flow of cheese into cheese pieces.

Figure 6:
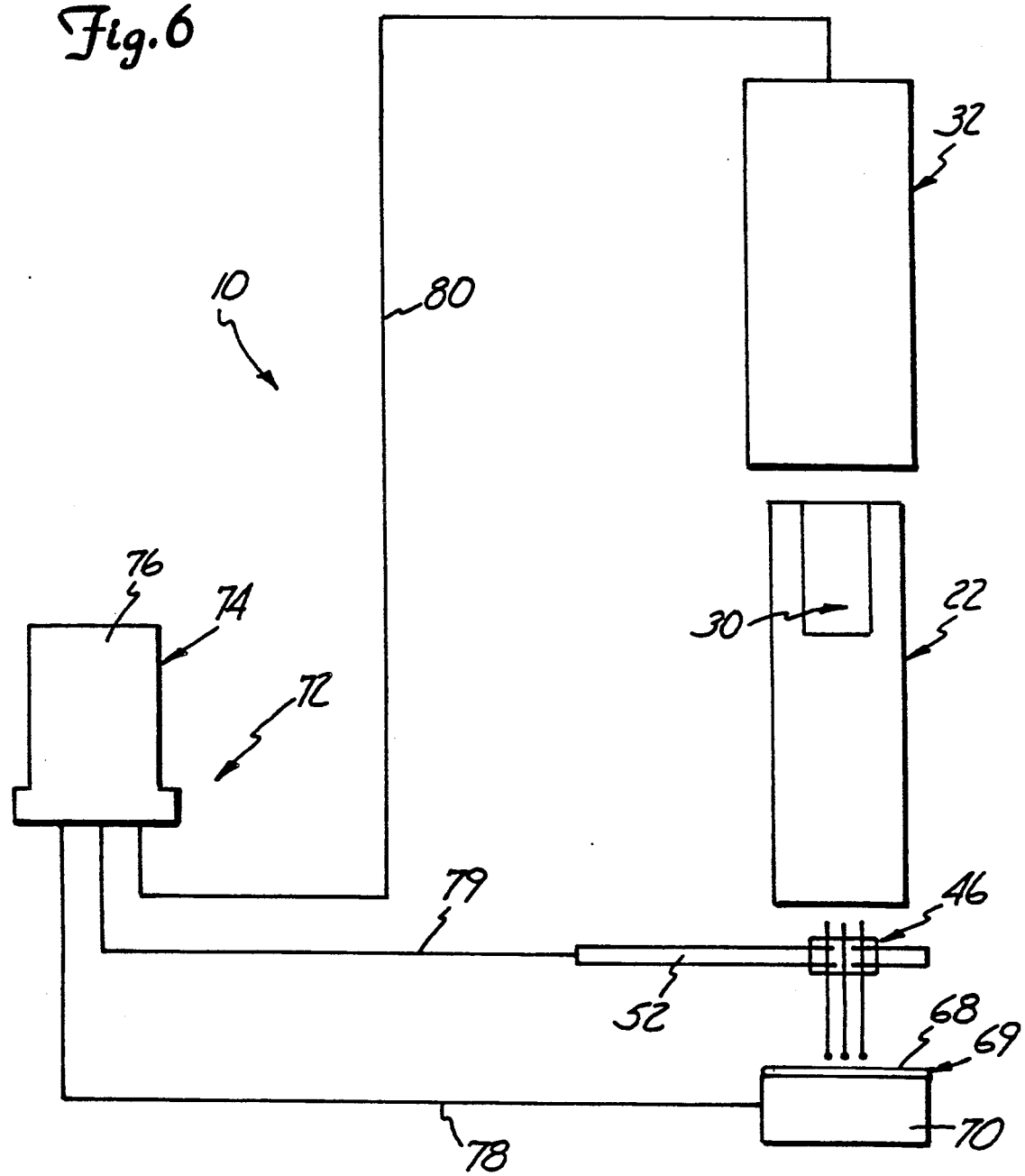
FIG. 6 is a block diagram schematic view of the depositing mechanism and a control mechanism of the semi-solid food depositor of the present invention.

As seen in FIG. 6, these cheese pieces are deposited within a fixed area, such as a top surface 68, of a receptacle, such as a pizza crust 69. The pizza crust is positioned atop a scale 70 which forms part of a control mechanism 72 of the semi-solid food depositor 10. The scale 70 determines the amount of cheese deposited on the pizza crust 69. To accomplish this, the scale 70 with the pizza crust 69 thereon is automatically zeroed so that positive weights registered on the scale 70 reflect amounts of cheese deposited on the pizza crust 69 by the depositing mechanism 12. The control mechanism 72 further includes a control module 74 having a microprocessor 76 which is linked to the scale 70 by a communications channel 78. The microprocessor 76 is further linked via a communications link 79 to the cutoff valve 52 of the depositing mechanism 12. The control module 74 controls the movement of the cutoff valve 52 between open and closed positions and thereby the amount of cheese extruded from the extrusion cylinder 22 onto the pizza crust 69. A communication line 80 links the microprocessor 76 to the ram mechanism 32 to control movement of the piston member 36. In addition, the control module 74 may be linked to the extrusion cylinder 22 to control the infeeding of cheese into the infeed opening 30 if this process is automated.

In operation, the amount of cheese deposited on the top surface 68 of the pizza crust 69 is controlled by the interaction of the ram mechanism 32, scale 70, control module 74 and cutoff valve 52. The amount of cheese deposited on the pizza crust 69 is such that the total weight of the cheese falls within a preselected target weight range. This target weight range is approximately ±1% of a predetermined target weight, such as 40 grams.

In practice, the valve 52 is opened and the piston member 36 is actuated to deliver a first deposit of a predetermined amount of cheese to the top surface 68 of the pizza crust 69. The weight of the first amount of cheese is equal to or less than the predetermined target weight. The interval of the first deposit (i.e., the interval of time between the start of the first deposit and the closing of the cutoff valve 52) and thereby the predetermined amount of cheese of the first deposit, is based upon the rate of deposit of the cheese used in the process. The rate of deposit of the cheese is based upon previous cheese deposits whose rate of deposit was calculated by the control module 74.

It is assumed that the consistency (which determines the rate of deposit) of one cheese deposit is very much like that of the previous cheese deposit. Hence, the rate of the first cheese deposit, which determines the interval of the first deposit and the approximate amount of cheese in the first deposit, is based upon the rate of the prior cheese deposit. The prior cheese deposit was calculated by the control module 74 (based upon the weight of the prior cheese deposit as determined by the scale 70) once the prior cheese deposit was fully deposited on the pizza crust 69.

Once the first deposit is delivered to the pizza crust 69, the scale 70 determines the precise weight of the amount of cheese of the first deposit. For example, the scale 70 may determine that the first deposit contained precisely 28 grams of cheese. The scale 70 feeds this precise weight to the microprocessor 76 of the control module 74 which determines the difference in weight between the precise weight of the first amount and the predetermined target weight. In our example 12 grams (i.e., 40 grams −28 grams=12 grams).

Using this difference the control module 74 actuates the cutoff valve 52 so that the depositing mechanism 12 delivers a second amount of cheese to the upper surface 68 of the pizza crust 69. This second amount is based upon the difference between the precise weight and the predetermined target weight so that the total weight of the first and second amounts of cheese deposited on a pizza crust falls within the preselected target range.

The control module 74 determines the interval of the second deposit (i.e., the interval of time between the start of the second deposit and the closing of the cutoff valve 52) and thereby the approximate weight of the second deposit, based upon the difference between the precise weight of the first amount and the predetermined target weight and the rate of accumulation of the first deposit. In our example the control module 74 would actuate the depositing mechanism 32 for an interval of time so as to deposit approximately 12 grams of cheese in the second deposit, so that total weight of cheese pieces (i.e, the total weight of the first and second deposits) on the pizza crust is within the preselected target weight range (i.e., ±10% of a predetermined target weight of 40 grams).

The rate of accumulation of the first deposit is determined by the control module 74 based upon the precise weight of the first deposit as calculated by the scale 70. The rate of deposit of the first deposit is then used to predict the interval of time required for the second deposit.

However, if the precise weight of the first amount of cheese pieces falls within the preselected target weight range, their is no need for the control module 74 to actuate the depositing mechanism 12 to deposit the second amount of cheese pieces.

In an alternative embodiment, the weight of the first deposit of cheese pieces is monitored by the scale 70 while the first deposit is being deposited on the pizza crust 69. This accumulation of weight information is continually fed to the control module 74. While the first deposit of cheese pieces is being deposited, the control module 74 uses the accumulation of weight information to determine the rate at which cheese is being deposited on the pizza crust. Based upon this rate of deposit calculation, the control module 74 determines the desired cutoff valve closure time. With the first amount of cheese pieces deposited on the pizza crust, the scale 70 then determines the precise weight of the first amount. This precise weight is then fed to the control module 74 which determines the difference between the precise weight of the first amount and the predetermined target weight.

Once this difference is determined, the control module 74 uses this information to once again actuate the depositing mechanism 12 to deposit a second amount of cheese pieces on the pizza crust 69. The weight of the second amount is determined by the control module 74 such that the total weight of cheese pieces (i.e., the total weight of the first and second deposits) on the pizza crust is within the preselected target weight range. The control module 74 determines the interval of the second deposit (i.e., the interval of time between the start of the second deposit and the closing of the cutoff valve) based upon the difference between the precise weight of the first amount and the predetermined target weight and the rate of accumulation of the first deposit. However, if the precise weight of the first amount of cheese pieces falls within the preselected target weight range, there is no need for the control module 74 to actuate the depositing mechanism 12 to deposit the second amount of cheese pieces.

The semi-solid food depositor 10 is relatively uncomplicated and consistently achieves a deposit weight variation no greater than ±10% from a predetermined target weight. The deposit weight variation of less than ±10% of a predetermined target weight is achieved through a usually two step process. Prior art devices such as Hochandel use a one step process. The one step process results in a cheese deposit weight variation of up to ±30% from a target weight due to inconsistencies in the cheese such as air pockets and density differences. Based upon a ±30% variation, a pizza shell can have as little as 28 grams of cheese based upon a 40 gram target weight. Variations greater than ±20% are easily noticeable by customers buying the pizza. These cheese inconsistencies between individual pizzas by the same manufacturer can put off customers and cause the customers to choose another brand of pizza.

With the usually two step deposit method in accordance with the present invention, a first amount of cheese is deposited on the pizza crust 69. This first deposit can vary up to ±30% from the target weight of 40 grams. Based upon a ±30% variation, the pizza crust 69 can have as little as 28 grams of cheese after the first deposit. The control module 74 takes this information and actuates the depositing mechanism 12 so as to deposit the remaining 12 grams of cheese. However, based upon the ±30% variation, the second deposit can result in as little as an additional 8.4 grams of cheese being deposited on the pizza crust 69. However, adding together the first and second deposits (28 grams +8.4 grams=36.4 grams) results in a total of 36.4 grams of cheese being deposited on the pizza crust 69. The 36.4 grams is within ±10% target weight variation of the target weight of 40 grams.

Although the present invention has been described with reference to preferred embodiments, workers skilled in the art will recognize that changes may be made in form and detail without departing from the spirit and scope of the invention.

What is claimed is:

1. A method of controlling an amount of a semisolid food product deposited within a fixed area defined by a receptacle, such that a total weight of the amount of the semi-solid food product deposited within the fixed area falls within a preselected target weight range, comprises the steps of:

providing a mechanism for depositing the semi-solid food product within the fixed area;

depositing a first amount of semi-solid food product within the fixed area defined by the receptacle, the weight of the first amount of semi-solid food product being equal to or less than a predetermined target weight that falls within the preselected target weight range;

weighing the receptacle to determine a precise weight of the first amount of semi-solid food product deposited within the fixed area;

determining the difference between the precise weight of the first amount of semi-solid food product and the predetermined target weight; and depositing a second amount of semi-solid food product if necessary within the fixed area, the weight of the second amount of semi-solid food product being based upon the difference between the precise weight and the predetermined target weight such the total weight of the semi-solid food product falls within the preselected target weight range.

2. The method of claim 1 wherein the depositing mechanism includes an extrusion system and wherein depositing the first and second amounts of semi-solid food product within the fixed area includes:

feeding a quantity of the semi-solid food product into the extrusion system; and actuating a pressure element of the extrusion system to apply pressure to the quantity of semi-solid food product and force the semi-solid food product through an extrusion port to produce the first and second amounts of semi-solid food product.

3. The method of claim 2, and further including the steps of:

providing the extrusion system with a cutting mechanism; and cutting the first and second amounts of semi-solid food product into semi-solid food pieces with the cutting mechanism.

4. The method of claim 1 wherein the preselected target weight range is within ±10% of the predetermined target weight.

5. The method of claim 1 wherein the semi-solid food product is selected from a group composed of cheese, sauce, pepperoni, hamburger and sausage, wherein receptacle is a pizza crust and wherein the fixed area is an upper surface of the pizza crust.

6. The method of claim 1 wherein the steps define a depositing cycle and wherein the depositing cycle is performed in less than five seconds.

7. The method of claim 6 wherein the depositing cycle is performed in less than one second.

8. A control system for controlling the amount of a semi-solid food product deposited within a fixed area defined by a receptacle, comprising:

a mechanism for depositing the semi-solid food product within the fixed area, including:
   means for forcing the semi-solid food product through an exit port so as to deposit the semi-solid food product within the fixed area; and a control mechanism, including:
   a scale for supporting the receptacle and determining the weight of the semi-solid food product deposited within the fixed area; and a control module coupled between the scale and the depositing mechanism for controlling the amount of semi-solid food product deposited by the depositing mechanism within the fixed area based upon weight information obtained from the scale.

9. The control system of claim 8, and further including:
a cutting mechanism mounted adjacent to the exit port of the forcing means, the cutting mechanism separating the quantity of semi-solid food product forced through the exit port into a plurality of semi-solid food pieces.

10. The control system of claim 9 wherein the cutting mechanism includes:
an air knife having a air nozzle positioned adjacent to the exit port; and
a compressor for delivering pulses of air through the air nozzle that act to sever the quantity semi-solid food product forced through the exit port into the plurality of semi-solid food pieces.

11. The control system of claim 10 wherein the exit port includes a plurality of extrusion channels and wherein the air knife includes a plurality of air nozzles positioned adjacent to the plurality of extrusion channels for severing the quantity of semisolid food product into the semi-solid food pieces as the semi-solid food product exits the extrusion channels.

12. The control system of claim 8, and further including:
a cutoff valve movably mounted adjacent to the exit port, the cutoff valve being movable between an open position that permits the quantity of semi-solid food product to be forced through the exit port, and a closed position that prevents the forcing of semi-solid food product from the exit port.

13. The control system of claim 8 wherein the means for forcing includes:

an extrusion cylinder having a first end and a second end, the first end having an opening through which a quantity of semi-solid food product can be inserted into the extrusion cylinder, the second end having an exit port;
a piston member movable within the extrusion cylinder so as to force the quantity of semi-solid food within the extrusion cylinder through the exit port such that the semi-solid food product is deposited within the fixed area defined by the receptacle;
a drive mechanism coupled to the piston member for moving the piston member relative to the extrusion cylinder.

14. The control system of claim 8 wherein the semi-solid food product is selected from a group composed of cheese sauce, pepperoni, hamburger and sausage, wherein the receptacle is a pizza crust and wherein the fixed area is an upper surface of the pizza crust.

15. A mechanism for depositing a semi-solid food product within a fixed area defined by a receptacle, comprising:
an extrusion device having an open first end and an exit port at its second end, the extrusion cylinder being configured to receive a quantity of the semi-solid food product;
a pressure element movable within the extrusion device so as to force the quantity of semi-solid food within the extrusion device through the exit port such that the semi-solid food product is deposited within the fixed area defined by the receptacle;
a drive mechanism coupled to the pressure element for moving the pressure element relative to the extrusion device; and
an air knife having a air nozzle positioned adjacent to the exit port; and
means for delivering pulses of air through the air nozzle that act to sever the quantity semi-solid food product forced through the exit port into the plurality of semi-solid food pieces.

* * * * *

UNITED STATES PATENT AND TRADEMARK OFFICE
CERTIFICATE OF CORRECTION

PATENT NO. : 5,073,391
DATED : December 17, 1991
INVENTOR(S) : Jimmy A. DeMars et al It is certified that error appears in the above-identified patent and that said Letters Patent is hereby corrected as shown below:

```
Col. 8, line 49, after "wherein", insert --the--.
Col. 10, line 16, after "cheese", insert a --,--.
```

Signed and Sealed this

Thirteenth Day of July, 1993

Attest:

MICHAEL K. KIRK

Attesting Officer

Acting Commissioner of Patents and Trademarks